US005639060A

United States Patent [19]

Spoonts et al.

[11] Patent Number: 5,639,060
[45] Date of Patent: Jun. 17, 1997

[54] MOUNTING BRACKET FOR COMPUTER SPEAKERS

[76] Inventors: Sean K. Spoonts; Kevin L. Smith, both of 147 W. Marion Ave., Punta Gorda, Fla. 33950

[21] Appl. No.: 219,962

[22] Filed: Mar. 30, 1994

[51] Int. Cl.$^6$ ........................................ E04G 3/00
[52] U.S. Cl. .......................... 248/683; 248/918; 211/88
[58] Field of Search ....................... 211/88, 90, 112, 211/135; 248/205.3, 214, 219, 308, 918, 683

[56] References Cited

U.S. PATENT DOCUMENTS

| | | | |
|---|---|---|---|
| 905,944 | 12/1908 | Southard | 211/88 X |
| 2,639,040 | 5/1953 | Tapley | 211/135 X |
| 4,902,078 | 2/1990 | Judd | 248/918 X |
| 4,960,257 | 10/1990 | Waters | 248/918 X |
| 5,082,235 | 1/1992 | Crowther | 248/331.4 |
| 5,190,258 | 3/1993 | Yu | 248/918 X |

*Primary Examiner*—Alvin C. Chin-Shue
*Attorney, Agent, or Firm*—William E. Noonan

[57] ABSTRACT

A bracket assembly for mounting an audio speaker to a computer. The bracket assembly includes a mounting bracket having an upper section that is engaged with an upwardly facing surface of the monitor. A generally vertical side section depends from the upper section and is engaged with a side surface of the monitor. A generally horizontal platform section is interconnected to the side section and extends transversely from the side section and outwardly from the side surface of the monitor for supporting an audio speaker thereon. The mounting bracket is secured by an adhesive tape to the computer monitor.

13 Claims, 5 Drawing Sheets

5,639,060

MOUNTING BRACKET FOR COMPUTER SPEAKERS

FIELD OF THE INVENTION

This invention relates to a computer accessory and, in particular, to a bracket assembly for mounting an audio speaker to the monitor of a personal computer.

BACKGROUND OF THE INVENTION

As the popularity of personal computers has increased, so too has the use of various types of computer accessories, such as audio speakers. A wide variety of these speakers are now available for use with computers. However, conventional speakers typically exhibit one or more problems that hinder their optimal use with the computer.

Most audio speakers are placed adjacent the computer monitor on a table or other flat surface of the computer work station. This placement tends to clutter the work area and can impair the computer operator's efficiency. Moreover, access to the speakers may be hindered by other equipment. And because the speakers are normally placed on the same table that supports the monitor, they are usually located well below the level of the operator's ears and tend to produce a poor audio output. Sound quality may be further reduced because the speakers are often scattered about the work station and are not necessarily pointed toward the operator.

Attempts have been made to improve the efficiency and clarity of computer speakers by mounting them to the monitor. However, to date, most of the brackets designed for this purpose have been suitable for use with only a single brand of speaker. For example, a custom bracket manufactured by Sony Corporation employs a slot that engages a complementary hook on the back of the speaker. This bracket is suitable for the Sony bracket only. Moreover, it supports the speaker such that the speaker is facing outwardly from the sides of the monitor at angle of approximately 90° to the operator. As a result, the audio quality is less than optimal. Koss manufactures a hanger for suspending a variety of speakers from a computer monitor. However, this device employs a fairly intricate and expensive construction. Additionally, the speakers are not firmly mounted and tend to jiggle when the operator strikes the keyboard.

SUMMARY OF INVENTION

It is therefore an object of the present invention to provide a bracket assembly for quickly, conveniently and firmly mounting the vast majority of currently available audio speakers to a computer monitor.

It is a further object of this invention to provide a bracket assembly that mounts audio speakers to a computer monitor at a height, separation and orientation that provides significantly improved audio performance.

It is a further object of this invention to provide a relatively inexpensive and simply constructed audio speaker mounting bracket that is readily adapted for attachment to and use with virtually all available personal computer monitors.

It is a further object of this invention to provide a mounting bracket for a computer audio speaker that permits the orientation of the speaker to be quickly and conveniently adjusted to improve audio quality.

It is a further object of this invention to provide a mounting bracket for audio speakers that significantly improves computer work station efficiency by mounting the audio speakers neatly to the monitor and removing them from the table, desk and other areas of the work station.

This invention features a bracket assembly for mounting an audio speaker to a computer monitor. The assembly includes a mounting bracket having an upper section that is engaged with an upwardly facing surface of the monitor, a generally vertical side section that depends from the upper section and is engaged with a side surface of the monitor, and a generally horizontal platform section interconnected to the side section and extending transversely from the side section and outwardly from the side surface of the monitor for supporting the audio speaker thereon. There are means for securing the bracket to the monitor.

In a preferred embodiment, the upper section is generally flat and extends generally horizontally from the side section. The side section may include a relatively narrow upper portion and a relatively wide lower portion. The side section may have straight forward and rearward edges that diverge from the upper portion to the lower portion. The forward and rearward edges may form differing angles with the platform such that the side section is offset relative to the platform. The upper section may have a width that is substantially the same as the upper portion of the side section. The upper section and the platform section are preferably arranged substantially parallel to one another when the bracket is mounted on a monitor and a speaker is placed on the platform.

The means for securing may include adhesive means and such adhesive means are typically attached to at least one of the upper section and the side section. A preferred adhesive means is a two sided tape. Shim means may be interposed between the upper section and the upper surface of the monitor to horizontally adjust the platform section. Again, such shim means may include a two sided tape which also helps to secure the bracket to the monitor.

The side section may include generally parallel forward and rearward edges and the upper section may extend between the forward and rearward edges. In such embodiments, the upper section is preferably flat and is sloped between the forward and rearward edges. Normally, the upper section is sloped downwardly from the rearward edge to the forward edge.

The platform section may include a tray having a substantially flat horizontal surface and a lip formed peripherally around at least a portion of the horizontal surface. A sound dampening mat is preferably disposed on the horizontal surface for supporting the audio speaker thereon. The mat may include an elastomeric webbing or a closed cell foam.

DETAILED DESCRIPTION OF PREFERRED EMBODIMENTS

Other objects, features and advantages will occur from the following description of preferred embodiments and the accompanying drawings, in which.

Figure 1:
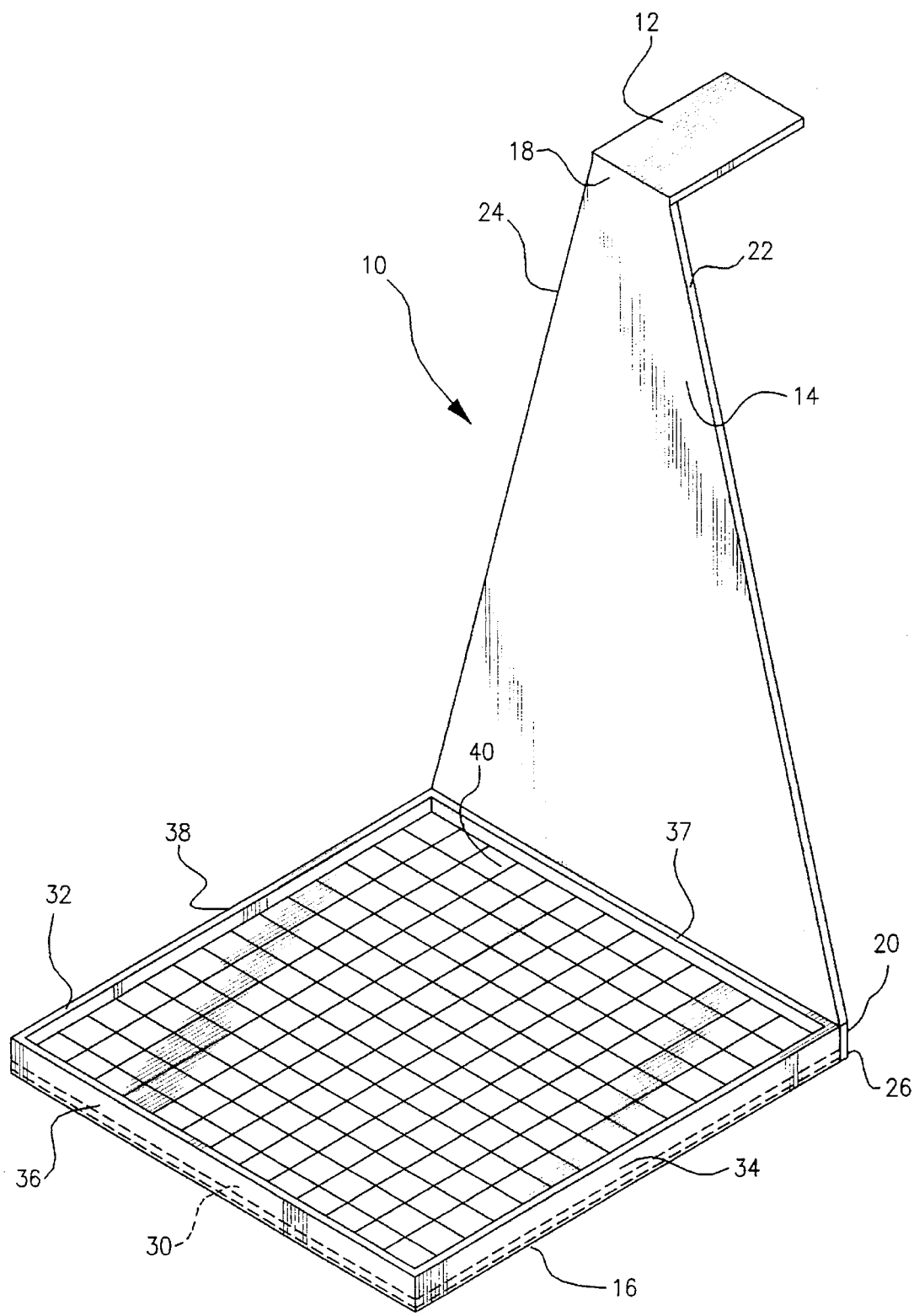
FIG. 1 is a perspective view of a preferred mounting bracket according to this invention.
Figure 2:
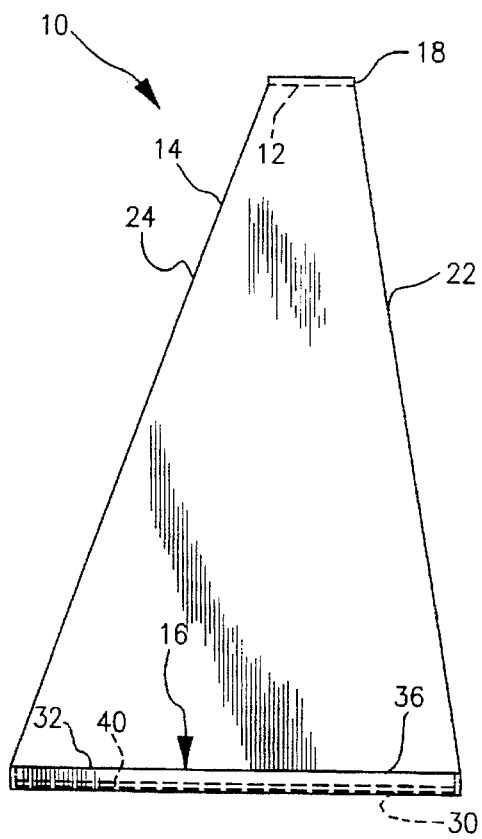
FIG. 2 is an elevational front view of the mounting bracket of FIG. 1.
Figure 3:
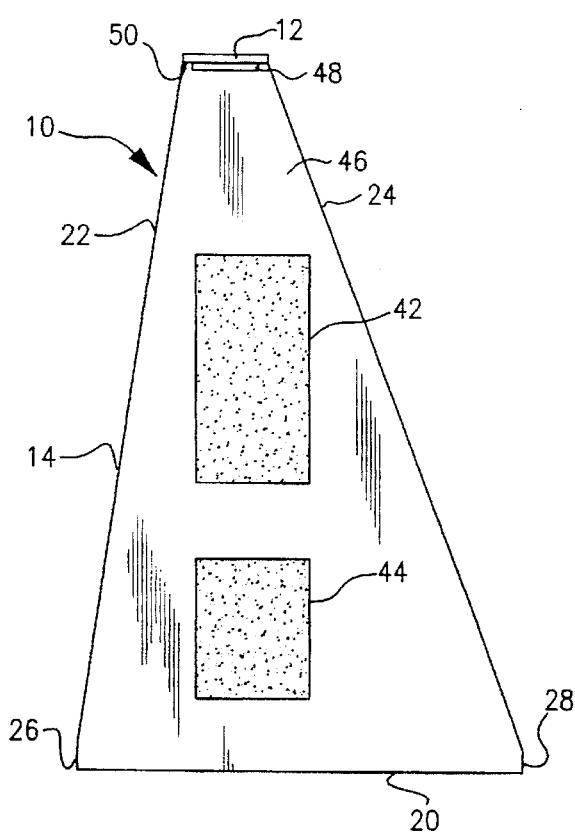
FIG. 3 is an elevational rear view of the mounting bracket of FIGS. 1 and 2.

There is shown in FIGS. 1–3 a computer speaker mounting bracket 10. The bracket includes a generally flat, horizontal upper section 12, a generally flat, vertical side section 14 that depends from upper section 12 and a generally horizontal platform section 16 that is attached to and extends transversely from side section 14. Sections 12, 14 and 16 are preferably composed of a lightweight yet durable material that is non-conductive and non-flammable. Typically, bracket 10 is composed of a rugged plastic similar to the material employed by computer monitors. The sections 12, 14 and 16 of bracket 10 are unitarily interconnected such that the bracket defines a one-piece element. The bracket is manufactured using various known techniques such as injection molding or the like.

Side section 14 exhibits a generally triangular shape. The side section includes a relatively narrow upper portion 18 and a relatively wide lower portion 20. Forward and rearward straight edges 22 and 24 diverge from narrow portion 18 to wide portion 20. As best seen in FIGS. 1 and 3, the lower end of side section 14 includes a relatively short pair of parallel edges 26 and 28. As best shown in FIGS. 2 and 3, edge 24 extends from edge 28 at an angle that is greater than the angle at which edge 22 extends from edge 26. Consequently, upper section 12 is offset toward a forward edge of platform 16. This permits the position of bracket 10 to be adjusted by switching bracket 10 to the opposite side of the computer monitor, as is described more fully below.

Upper section 12 extends transversely from upper portion 18 in a direction opposite to that of platform section 16. A perpendicular angle is formed between upper section 12 and depending side section 14. The upper section has a width that is equal to the width of narrow portion 18 of side section 14.

Platform section 16 includes a substantially flat horizontal surface 30, shown in phantom in FIGS. 1 and 2, which is generally parallel to upper section 12, when a speaker is mounted on the platform, and which extends at an angle of about 86° to the side section 14 before the bracket is mounted. Surface 30 is peripherally surrounded by a lip 32 that extends laterally upwardly from surface 30. Lip 32 includes forward and rearward segments 34 and 38. Side segments 36 and 37 of lip 32 extend between and interconnect segments 34 and 38. Segment 37 flushly and longitudinally engages the outside surface of side section 14. The lip segments are interconnected at right angles. Accordingly, platform 16 has a rectangular shape. Raised lip 32 borders four sides of the platform. As a result, platform 16 defines a shallow tray.

A sound dampening mat 40 is mounted on horizontal platform surface 30. Mat 40 has a shape that generally conforms with the shape of the area bounded by lip 32 such that the mat fits neatly within the tray-like platform. Mat 40 is preferably composed of a closed cell foam, rubber or other synthetic elastomeric webbing and serves to both dampen the resonance produced by speakers that are mounted on the platform and to hold the speakers firmly in place.

Means for securing bracket 10 to a computer monitor are best illustrated in FIG. 3. In particular, such means comprise two-sided adhesive strips 42 and 44 that are mounted on the inside surface 46 of side section 14. An additional piece of two-sided adhesive strip 48 is secured to the lower surface 50 of upper section 12. Each of these adhesive elements typically includes a piece of two sided tape such as is produced by 3M Corp. Various alternative adhesives and other means for attachment (such as Velcro™) may be employed within the scope of this invention. However, a two-sided adhesive tape is particularly advantageous because it achieves a very secure and relatively permanent attachment, but at the same time does not interfere with or permanently damage the monitor.

Figure 4:
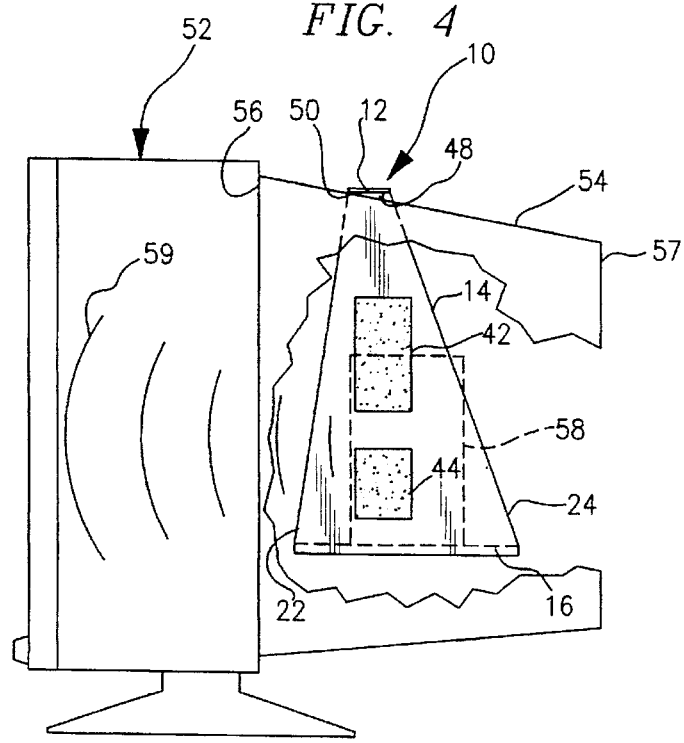
FIG. 4 is a partly cut away side view of a computer monitor with the mounting bracket of FIGS. 1–3 mounted on the opposite side of the monitor and with an adhesive shim interposed between the upper section of the bracket and the upper surface of the computer monitor for leveling the bracket.

Bracket 10 is mounted to a monitor 52 in the manner shown in FIG. 4. The monitor includes an upper surface 54 that slopes somewhat downwardly from a seam 56 to the rear edge 57 of monitor 52. Bracket 10 is mounted to monitor 52 by placing side section 14 against the side wall of the monitor such that the adhesive strips 42 and 44 (See also FIG. 3) engage the side wall and upper section 12 engages the upper surface 54 of the monitor. Adhesive strip 48 serves as a shim to level bracket 10. In particular, strip 48 is interposed between the lower surface 50 of upper section 12 and the upper surface 54 of monitor 52 and positioned on upper section 12 such that the entire bracket is tilted slightly forwardly and platform 16 is held on a generally horizontal plane. An audio speaker 58 is then placed on platform 16 such that the speaker is disposed within the peripheral lip that surrounds the platform. Because the platform is held on a horizontal plane, the speaker directs its sound forwardly toward the operator, as indicated by audio waves 59. Without the use of a shim between upper section 12 and monitor surface 54, bracket 15 would be tilted such that the speaker 58 would be pointed at a direction somewhat away from the operator's ears. Poor sound quality would likely result. In addition to serving as a shim, tape 48 also assists strips 42 and 44 in securing the bracket 10 to the monitor 52.

Figure 5:
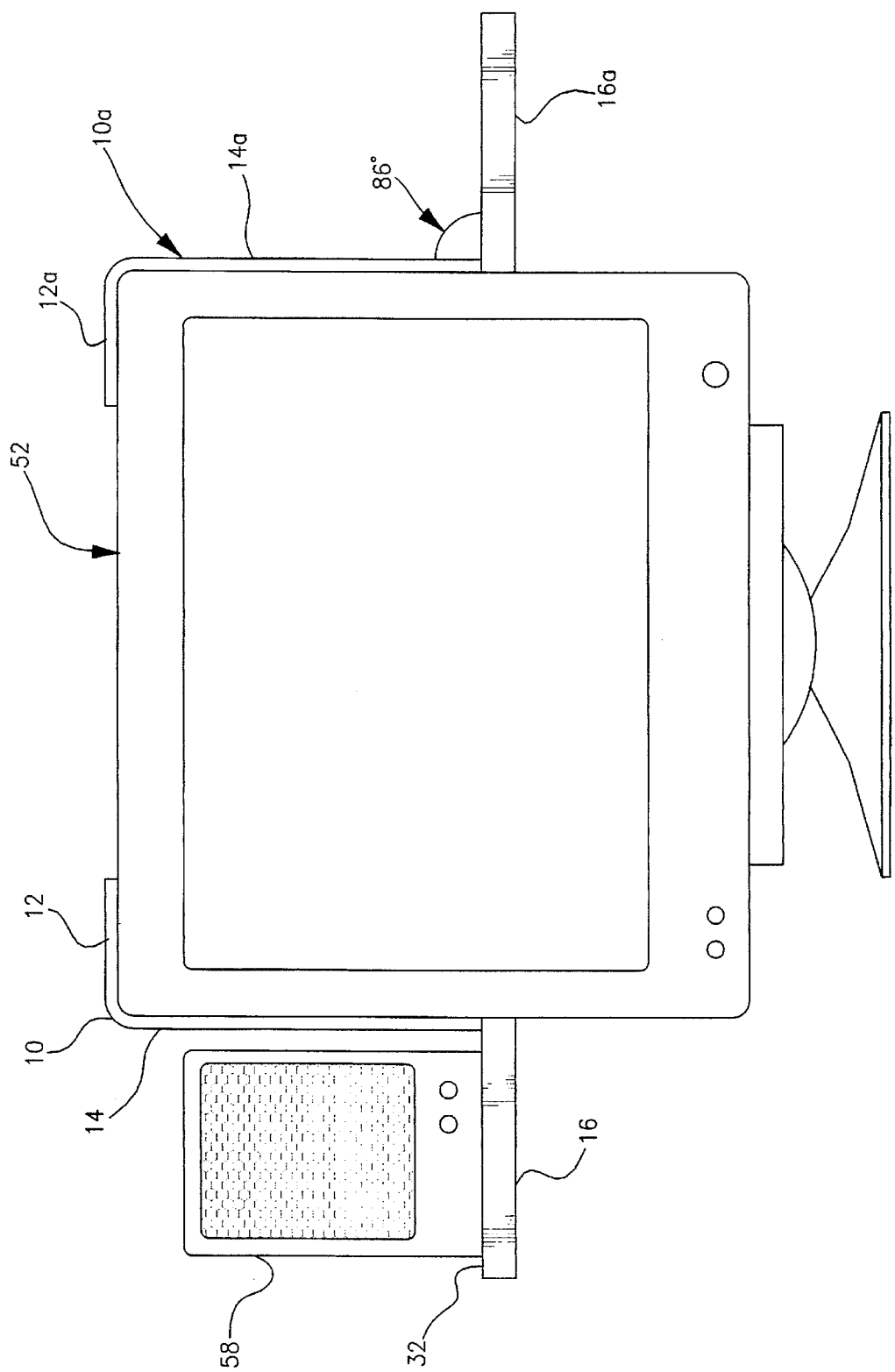
FIG. 5 is an elevational front view of a computer monitor to which a pair of mounting brackets are attached.

A pair of brackets 10 and 10a are mounted to monitor 52 in FIG. 5. Bracket 10a is mounted to the opposite side of computer monitor 52. Bracket 10a is constructed analogously to bracket 10 with the leading edge of bracket 10a's side section being formed at a steeper angle than its rearward edge. The upper and platform sections of bracket 10a are reversed in direction such that bracket 10a is mounted to the monitor symmetrically to bracket 10, but on the side of the monitor opposite to the side on which bracket 10 is mounted. In FIGS. 1–5, the angle that is formed between the forward edge of each bracket's side section and the platform is larger than the angle formed between the rearward edge and the platform. As a result, upper sections 12 and 12a are offset forwardly relative to platforms 16 and 16a, respectively. For certain monitors the positioning of the speakers along the sides of the monitor can be adjusted simply by reversing the sides of the monitor to which brackets 10 and 10a are mounted. In such cases side section edge 24 and the corresponding edge of bracket 10a become the "leading" edges of the respective brackets relative to the monitor. As a result, the speakers are projected relatively forwardly along the monitor toward the operator.

The generally perpendicular angle formed between each bracket's upper section 12, 12a and respective side section 14, 14a closely conforms to the angle between the upper surface and side wall surface of the monitor. As a result, a close tolerance fit is provided between the brackets 10 and 10a and monitor 52. This provides the overall assembly with a very neat and clean and aesthetically attractive appearance.

A single speaker 58 is mounted to bracket 10. It should be understood that a similar speaker is mounted in the same manner on bracket 10a. The speaker 58 is supported on platform 16 and, more particularly, is placed directly on top of the mat 40 depicted in FIGS. 1 and 2. The weight of speaker 58 flexes platform 16 downwardly such that it is perpendicular to side section 14. In the embodiment shown in FIG. 5, the speaker is surrounded by the platform lip 32 and the side section 14. The lip and mat 40 prevent the speaker from slipping off of, or being inadvertently knocked from the platform. At the same time, adequate room is normally provided on the platform for adjusting the orientation of speaker 58 somewhat. This permits the speaker to be repositioned to provide the computer operator with improved sound quality that meets his or her individual needs. The previously described mat helps to dampen the resonance of the speaker and thereby further improves the audio quantity. It also helps keep the speaker stable. The speakers are held at a level that approximates the operator's eye and ear level so that optimal audio performance is achieved. Mounting the speakers to the sides of the monitor provides the computer operator ready access to the speakers and reduces computer work station clutter considerably.

The following are representative dimensions that may be used for the various parts of the bracket assembly 10. These dimensions are illustrative only and are not intended to limit the scope of the invention.

Length of Upper Section extending from Side Section: 2½"

Width of Upper Section: 1"

Height of Side Section: 7⅞"–8"

Platform Section: 5¼" wide×5½" deep

Height of Lip: ¼–⅜

Thickness of Upper Section, Side Section and Floor of Platform ⅛"

The above dimension of the platform section enable the bracket assembly to support over forty known computer speakers, which comprise virtually all speakers now available. The narrow upper section 12 permits computer accessories such as anti-glare visors, document clip holders, etc. to be attached to the monitor in conjunction with bracket 10.

Figure 6:
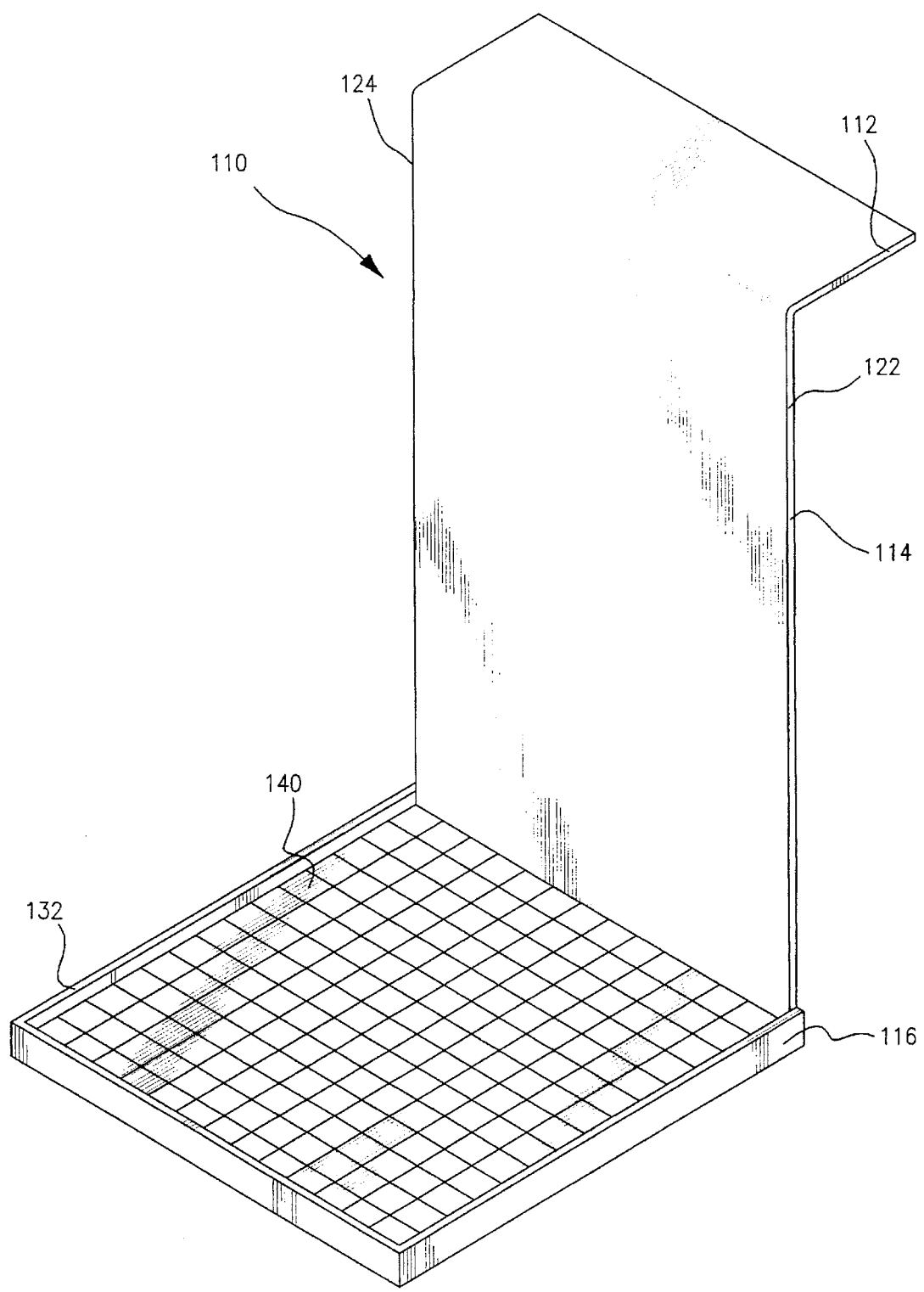
FIG. 6 is a perspective view of an alternative mounting bracket according to this invention.
Figure 7:
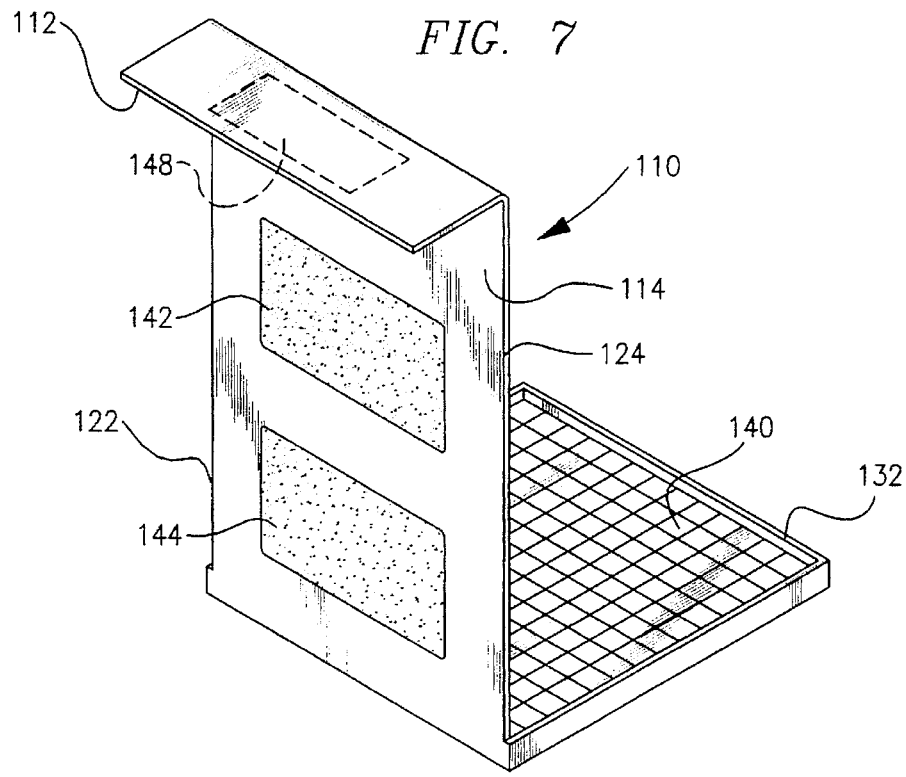
FIG. 7 is an alternative perspective view of the bracket of FIG. 6, in particular illustrating the adhesive bearing surface of the bracket.

FIGS. 6 and 7 illustrate an alternative bracket 110 according to this invention. This bracket again employs an upper section 112, a depending side section 114 and a platform section 116 that are preferably unitarily interconnected. The materials that compose bracket 110 and the techniques for constructing the bracket are analogous to those for the previously described embodiment.

Side section 114 includes a pair of parallel forward and rearward edges 122 and 124. Upper section 112 extends transversely from the upper end of side section 114 and platform section 116 extends transversely in an opposite direction from the lower end of side section 114. Upper section 112 again comprises a generally flat element. The upper section is sloped downwardly from rearward edge 124 to forward edge 122. This permits the bracket to be leveled when it is mounted to a standard computer monitor having a slightly downwardly sloped upper surface.

Platform 116 is analogous to the platform in the previously described embodiment. The platform includes a flat horizontal surface that is obscured in FIGS. 6 and 7. The flat surface is surrounded by a peripheral lip 132 that extends between edges 122 and 124 of side section 14. An elastomeric, resonance dampening mat 140 is carried by the platform within the area defined by raised lip 132 and side section 114.

As best shown in FIG. 7, two sided adhesive strips 142 and 144 are mounted on the inside surface of side section 114. A third two-sided adhesive strip 148 is similarly mounted on the inside surface of upper section 112.

Figure 8:
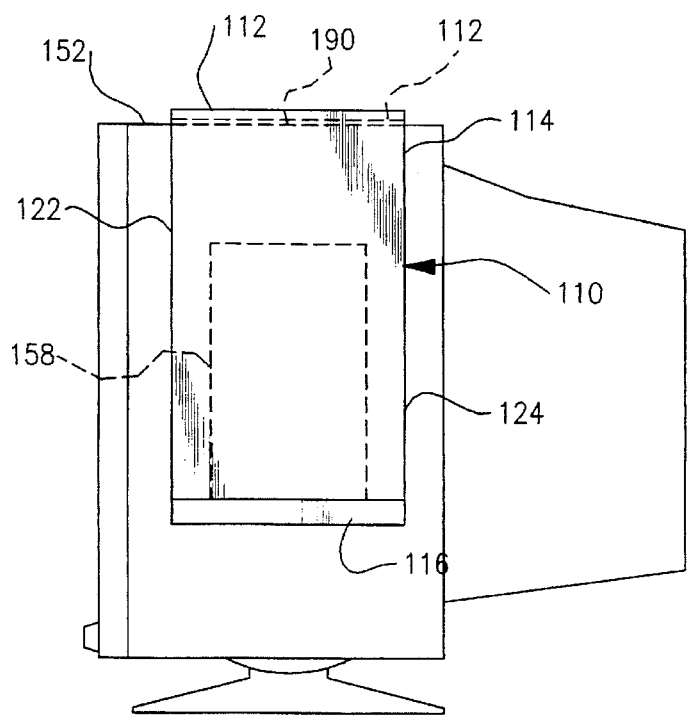
FIG. 8 is an elevational side view of a computer monitor to which the bracket of FIGS. 6 and 7 is mounted.

Bracket 110 is mounted to computer monitor 152 in the manner shown in FIG. 8. Side section 114 is placed on the side wall surface of the computer and upper section 112 is placed over the upper surface of the monitor. The bracket is then pressed against the monitor so that adhesive strips 142, 144 and 148 secure bracket 110 to monitor 152. The sloped width of upper section 112 conforms to the downwardly sloped upper surface 190 of monitor 152. As a result, platform section 116 is oriented substantially horizontally. Audio speaker 158 is placed on platform 116 in the manner previously described such that its sound is directed in a forward, horizontal direction toward the operator.

It should be noted that again, in the second embodiment, a separate bracket, wherein the upper section 112 slopes downwardly from the rearward edge 124 to the forward edge 122, must be manufactured for mounting on each side of the computer. The initial embodiment is more easily adjusted along the upper surface of the monitor so that greater flexibility and a wider range of mounting positions are possible. Otherwise, the second described embodiment yield similar advantages of improved audio performance and work station efficiency as are attained by the first embodiment.

Although specific features of the invention are shown in some drawings and not others, this is for convenience only, as each feature may be combined with any or all of the other features in accordance with the invention. Other embodiments will occur to those skilled in the art and are within the following claims.

What is claimed is:

1. A bracket assembly for mounting an audio speaker to a standard computer monitor having an upwardly facing surface and a side surface, said bracket assembly comprising:

a mounting bracket including an upper section that is engageable with the upwardly facing surface of the monitor;

a side section that depends from said upper section and is engageable with the side surface of the monitor; and a platform section interconnected to said side section and extending transversely from said side section, said platform section being extendible outwardly from the side surface of the monitor for supporting the audio speaker thereon, said side section including a relatively narrow upper portion, a relatively wide lower portion and straight forward and rearward edges that diverge from said upper portion to said lower portion, said platform section extending from said lower portion of said side section and said forward and rearward edges of said side section extending from said platform section at differing angles; and means for securing said bracket to the monitor.

2. The assembly of claim 1 in which said upper section is generally flat and extends generally horizontally from said side section.

3. The assembly of claim 2 further including shim means that are interposed between said upper section and the upper surface of the monitor to horizontally adjust said platform section.

4. The assembly of claim 1 in which said upper section has a width that is substantially the same as the width of said upper portion of said side section.

5. The assembly of claim 1 in which said means for securing include adhesive means.

6. The assembly of claim 5 in which said adhesive means are attached to at least one of said upper section and said side section.

7. The assembly of claim 5 in which said adhesive means include a two-sided tape.

8. The assembly of claim 1 in which said platform section includes a tray having a substantially flat horizontal surface and a lip formed peripherally around at least a portion of said horizontal surface.

9. The assembly of claim 8 in which a sound dampening mat is disposed on said horizontal surface for supporting the audio speaker thereon.

10. The assembly of claim 9 in which said mat includes an elastomeric webbing.

11. The assembly of claim 9 in which said map includes a closed cell foam.

12. The assembly of claim 8 in which said tray has a rectangular shape and includes a of approximately 5¼ inches and a depth of approximately 5½ inches.

13. The assembly of claim 1 in which said platform section extends from said side section at an angle slightly less than 90 degrees, at least when the audio speaker is not supported thereon.

* * * * *